United States Patent [19]

Seto et al.

[11] Patent Number: 4,712,118
[45] Date of Patent: Dec. 8, 1987

[54] LASER BEAM PRINTER

[75] Inventors: Kaoru Seto, Chigasaki; Yukihide Ushio, Higashi; Kenjiro Hori, Yokohama; Hiroshi Hashimoto; Toshio Yoshimoto, both of Tokyo; Kiyoshi Kanaiwa, Kawasaki, all of Japan

[73] Assignee: Canon Kabushiki Kaisha, Tokyo, Japan

[21] Appl. No.: 897,818

[22] Filed: Aug. 19, 1986

[30] Foreign Application Priority Data

Aug. 26, 1985 [JP] Japan .............................. 60-185912
Jan. 22, 1986 [JP] Japan ................................ 61-10010
Jan. 22, 1986 [JP] Japan ................................ 61-10013
Jan. 22, 1986 [JP] Japan ................................ 61-10014

[51] Int. Cl.⁴ .......................... G01D 9/42; G01D 15/14
[52] U.S. Cl. ................................... 346/108; 346/160; 358/285
[58] Field of Search .............. 346/108, 160; 358/285, 358/288; 250/235

[56] References Cited

U.S. PATENT DOCUMENTS 4,420,761 12/1983 Kitamura .............................. 346/108
4,449,046 5/1984 Zuckerman et al. ................. 250/235
4,539,478 9/1985 Sano .................................. 346/108 X Primary Examiner—E. A. Goldberg
Assistant Examiner—Patrick W. Foster
Attorney, Agent, or Firm—Fitzpatrick, Cella, Harper & Scinto

[57] ABSTRACT

A laser beam printer includes: a recording medium for forming an image; a scanning unit for scanning a beam modulated by an image signal on the recording medium; a beam detector for detecting the position of the beam scanned by the scanning unit and outputting a synchro signal which defines the record start position on the recording medium; a sheet position detector for detecting the position, in the direction of scanning the beam, of a sheet to which the image formed on the recording medium is transferred; and a controller for controlling the output timing of the synchro signal in accordance with the position of a sheet detected by the sheet position detector.

14 Claims, 34 Drawing Figures

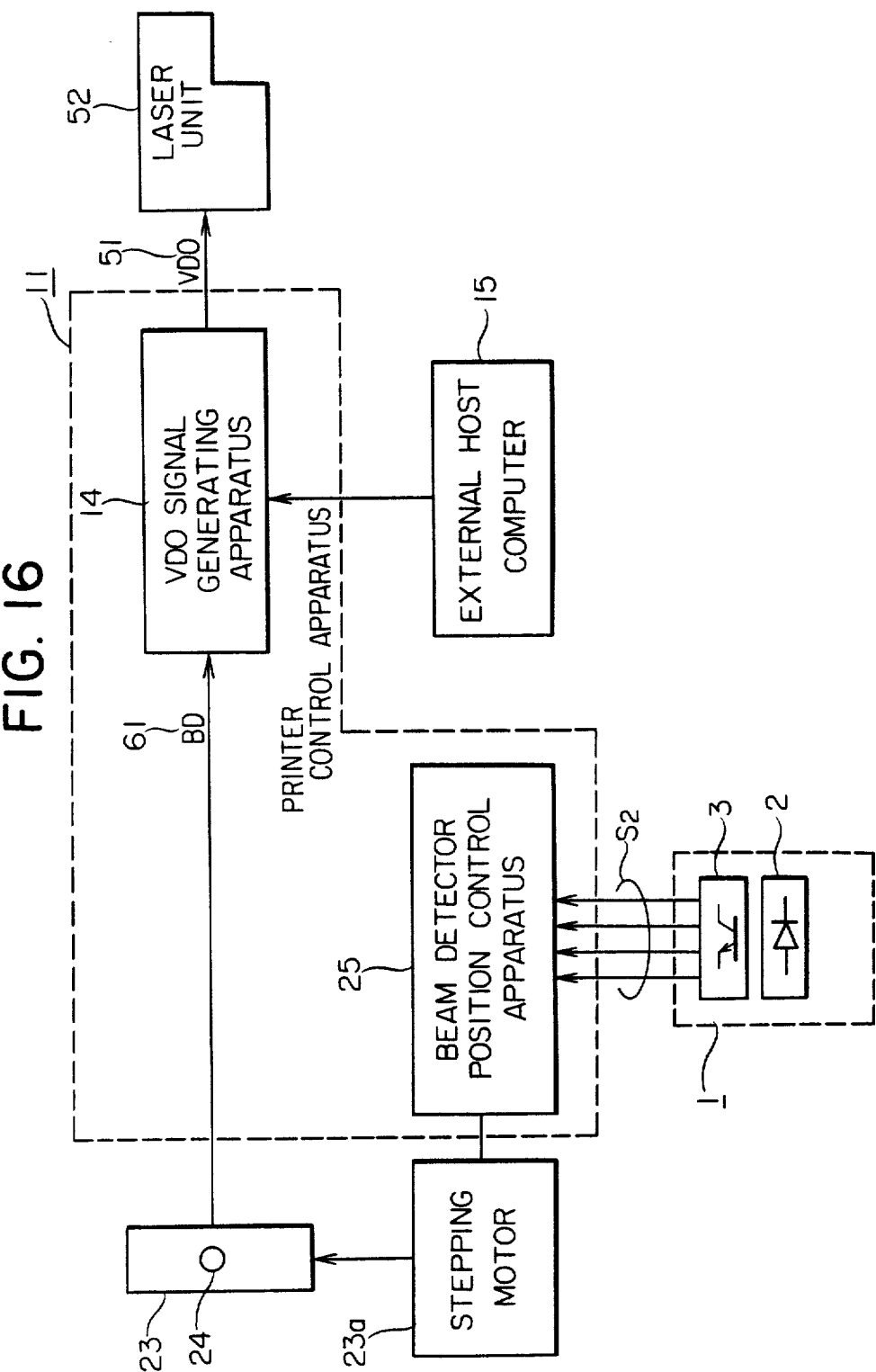

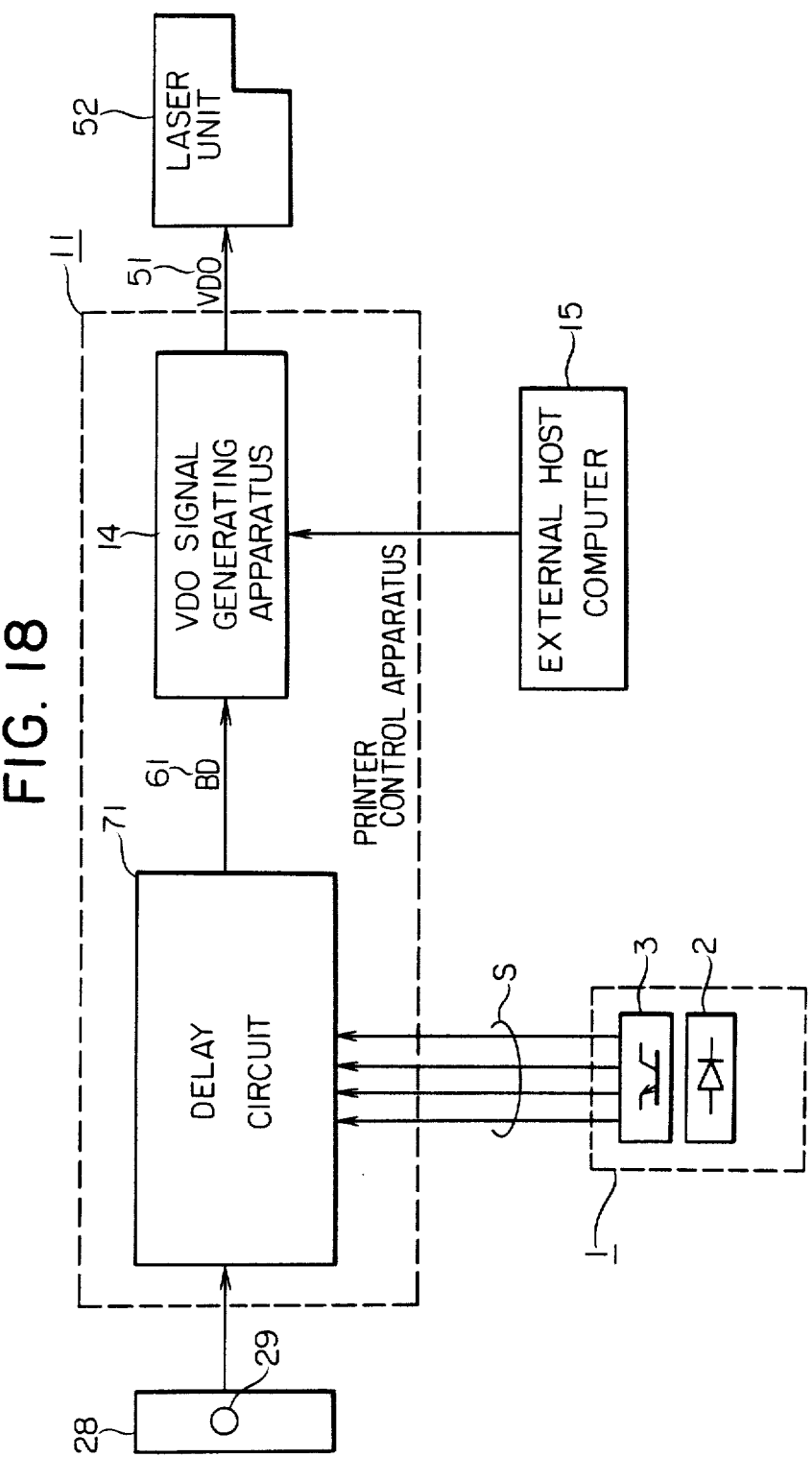

LASER BEAM PRINTER

BACKGROUND OF THE INVENTION

1. Field of the Invention

The present invention relates to a laser beam printer which scans a laser beam to reproduce an image.

2. Related Background Art

FIG. 10 is a view for explaining an image reproducing operation of a conventional laser beam printer. In the figure, an image signal (VDO) 51 is inputted to a laser unit 52 which modulates the signal to form an on-off modulated laser beam 53. A motor 54 rotates a polygon mirror 55 at a constant speed. A focussing lens 56 focusses a laser beam 57 deflected by the mirror on a photosensitive drum 58. Thus, a laser beam modulated by the image signal is scanned over the photosensitive drum 58 in the direction of horizontal scanning (in the direction of main scanning A). A beam detector 59 comprising a photoelectric conversion element 60, e.g., a photodiode, outputs a horizontal synchro signal (hereinafter called BD signal) which determines a timing of writing an image. A latent image formed on the photosensitive drum 58 is visualized by an unrepresented developing unit and it is transferred on a transfer sheet 62 at an unrepresented transfer unit using a developing agent toner).

The operation of each element will be described below.

The laser unit 52 generates a laser beam 53 modulated in accordance with an inputted image signal (VDO) 51. The VDO signal 51 is generated by an unrepresented control unit in the laser beam printer. The modulated laser beam 53 is applied to the polygon mirror 55 having a plurality of mirrors and driven by the motor 54, the applied laser beam being deflected in the horizontal direction. A constant speed revolution of the polygon mirror 55 makes the deflected laser beam 57 scan over the photosensitive drum 58 at a constant speed. The laser beam 57 is focussed on the photosensitive drum 58 by the focussing lens 56. While the photosensitive drum 58 rotates at a constant speed and the laser beam 57 scans over the photosensitive drum 58 at a constant speed, a latent image of the VDO signal 51 is formed on the photosensitive drum 58. In this case, as the laser beam 57 is applied to the photoelectric conversion element 60 of the beam detector 59 fixed near the position the laser beam 57 starts scanning, a BD signal 61 is generated from the photoelectric conversion element 60. The BD signal 61 generates once at each scanning of the laser beam 57 and has a constant period. The unrepresented control unit generates the VDO signal 51 corresponding to one scanning synchronously with the BD signal 61 to thereby define the image write start position in the main scan direction on the photosensitive drum 58.

FIGS. 11(a) to 11(d) show a timing chart illustrating the relationship between the VDO signal 51 and the BD signal 61, wherein reference numerals identical to those in FIG. 10 are used to indicate the same signals. A BD abnormality measuring signal 71 of FIG. 11(c) monitors if a VD signal 61 of FIG. 11(a) is outputted at a predetermined timing. A BD abnormality informing signal 72 of FIG. 11(d) informs of an abnormality when the BD signal 61 of FIG. 11(a) is not detected within one period of the BD abnormality measuring signal 71 of FIG. 11(c). In the Figures, T represents a time from when the BD signal is generated and to when the laser beam 57 reaches the effective image area on the photosensitive drum 58, To represents a scanning period of the BD signal 61, Ta represents a time from the trailing edge of the BD signal 61 to the trailing edge of the BD abnormality measuring signal 71, Tb represents a time from the trailing edge of the BD signal 61 to the leading edge of the BD abnormality measuring signal 71.

As seen from FIG. 11(a) to 11(d), after a lapse of a certain time T after the beam detector 59 detects the BD signal 61, the VDO signal 51 (indicated by slanted oblique lines) is generated. The timing chart corresponds to the operation during three scan lines.

As above, the latent image formed on the photosensitive drum 58 is visualized by a known electrophoto process and thereafter, it is transferred and fixed on a transfer sheet 62 to obtain a hard copy.

FIG. 12 is a plan view showing a relationship between the photosensitive drum 58 and the transfer sheet 62, wherein elements identical to those in FIG. 10 are represented by using same reference numerals.

In FIG. 12, L1 represents the left end position of an image to be formed on the transfer sheet 62, L2 represents a left margin of the transfer sheet, L3 represents a positional displacement, and L4 represents a distance from the photoelectric conversion element 60 to the left end position L1 of an image. L5 represents a distance from the photoelectric conversion element 60 to the left end of a transfer sheet 62 as set correctly. The transfer sheet 62 shown by a solid line is displaced from the correct position by L3.

Conventionally, a single photoelectric conversion element 60 has been provided on a beam selector 59 which is fixed in position relative to the photosensitive drum 58. Therefore, the left end position L1 of an image to be formed on the photosensitive drum 58 is unambiguously determined from the BD signal 61 and the VDO signal 51 shown in FIGS. 11(a) and 11(b). Particularly, to ensure the left margin L2 of an image to be transferred on a transfer sheet 62, the transfer sheet should be conveyed such that its left end passes at a distance L5 spaced apart from the photoelectric conversion element 60.

However, if a transfer sheet 62 is set displaced by L3 in the main scanning direction X as that shown by a solid line in FIG. 12, the left margin obtained on the transfer sheet 62 becomes L2-L3, and hence the same displacement in printed images in the main scanning direction. Thus, there occurs a problem of missing and changing a printed image.

SUMMARY OF THE INVENTION

An object of the present invention is to provide a laser beam printer eliminating the above problems.

Another object of the present invention resides in an improvement on a laser printer.

A further object of the present invention is to provide a laser printer capable of preventing missing an image even if a recording sheet is set displaced.

A still further object of the present invention is to provide a laser beam printer capable of preventing erroneously detecting an abnormality of a signal indicating a start timing when an image is written a laser beam.

The other objects of the present invention will become apparent from the following description in connection with the accompanying drawings and the appended claims.

BRIEF DESCRIPTION OF THE DRAWINGS

FIG. 16 is a block diagram for explaining the controlling operation of the laser beam printer of FIG. 15;

FIG. 18 is a block diagram for explaining the controlling operation of the laser beam printer according to another embodiment of the present invention.

DETAILED DESCRIPTION OF THE PREFERRED EMBODIMENTS

The emodiments of the present invention will now be described with reference to the accompanying drawings.

Figure 1:
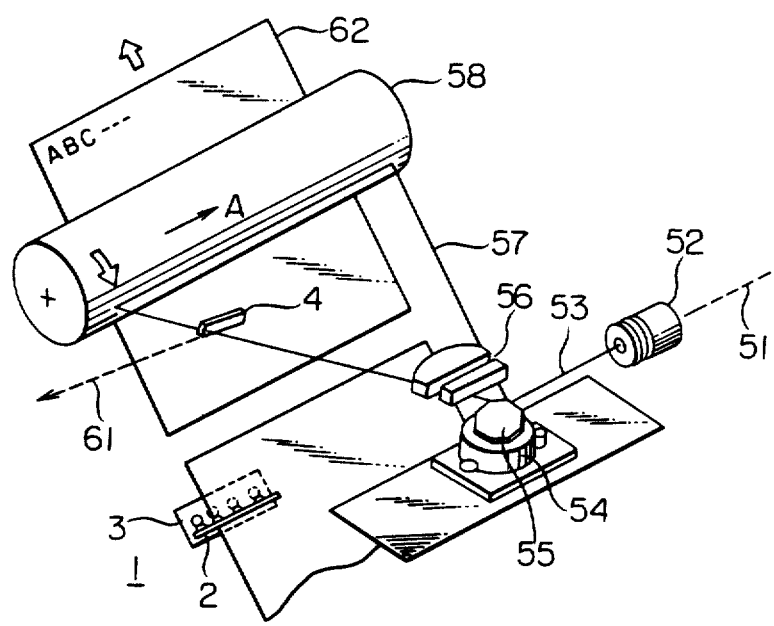
FIG. 1 briefly shows the laser beam printer according to an embodiment of the present invention.
Figure 10:
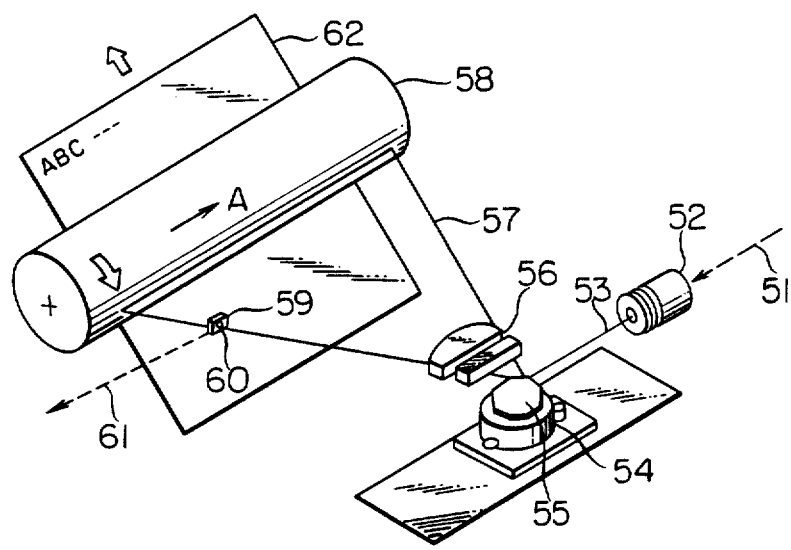
FIG. 10 is a view for explaining the image forming operation of a conventional laser beam printer.

FIG. 1 shows the outline of the laser beam printer according to an embodiment of the present invention, wherein elements identical to those in FIG. 10 are designated by using same reference numbers.

In the figure, a paper position detector 1 constituting detecting means of the present invention is constructed of an LED array 2 of 4 LEDs disposed at a predetermined position near the left end of a paper on a paper feeding path and a phototransistor array 3 of 4 phototransistors disposed symmetrically relative to a trahsfer sheet 62 on the paper feeding path. A beam detector 4 is constructed of a photodiode array 5 of 4 photodiodes and outputs a BD signal upon detection of a laser beam 5.

Figure 2:
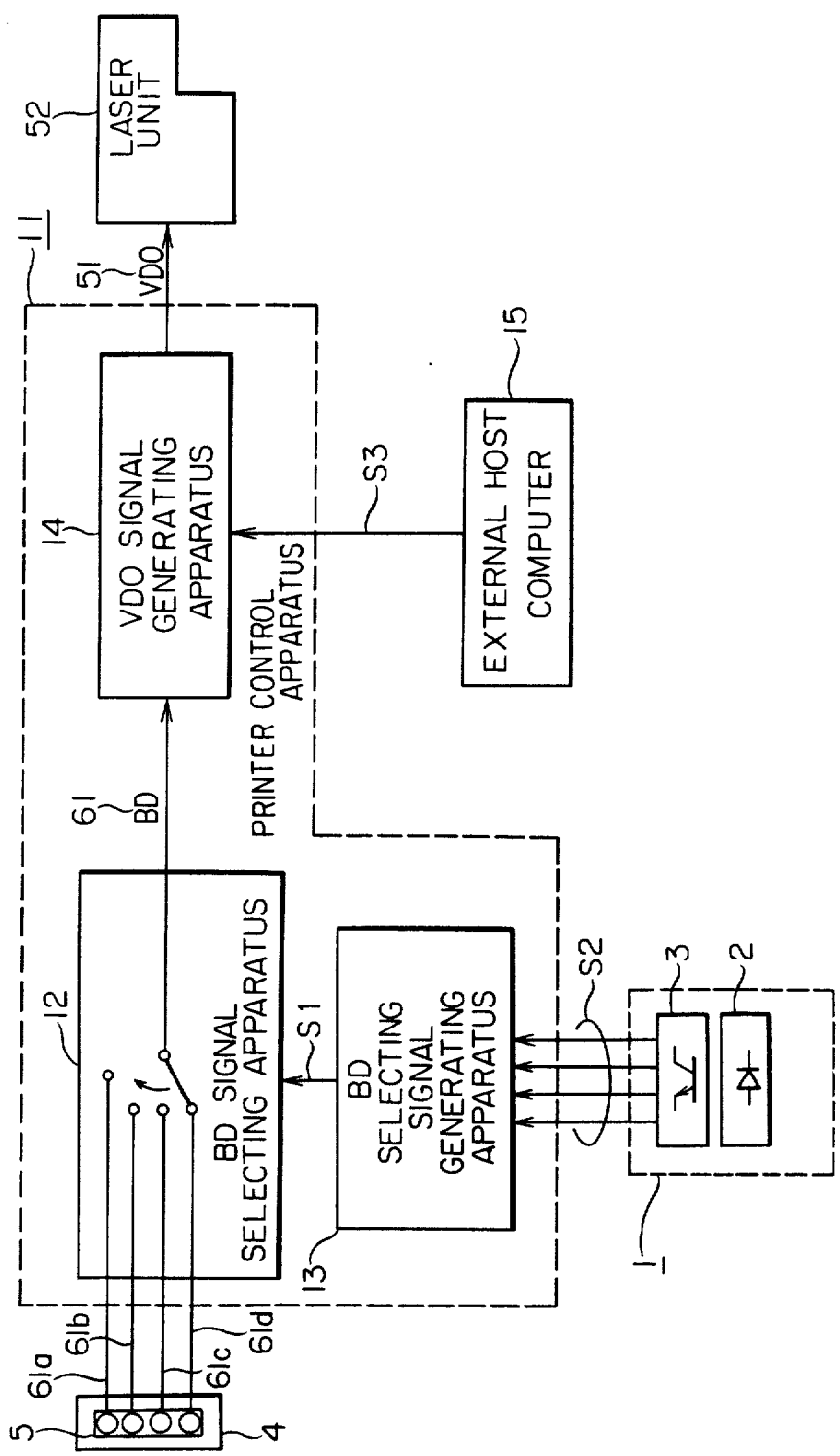
FIG. 2 is a block diagram illustrating the controlling operation of the laser beam printer of FIG. 1.

FIG. 2 is a block diagram for explaining the controlling operation of the laser beam printer shown in FIG. 1, wherein elements identical to those in FIG. 1 and FIG. 10 are represented by using same reference numerals and characters.

In FIG. 2, a printer control apparatus 11 constituting control means of the present invention is inputted with the BD signal 61 from the beam detector 4, paper position information from the paper position detector 1, and image information to be described later from an external host computer 15. The printer control apparatus 11 outputs a VDO signal 51 to a laser unit 52. A BD signal selecting apparatus 12 selects one of four BD signals 61a to 61d sent from the beam detector 4 in accordance with a BD selecting signal from a BD selecting signal generating apparatus 13, and outputs the selected BD signal to a VDO signal generating apparatus 14. The VDO signal generating apparatus 14 sends a VDO signal 51 to the laser unit 52 in synchro with the image information sent from the external computer 15 and the BD signal sent from the BD signal selecting apparatus 12.

The laser beam 57 scanning the photosensitive drum 58 is applied sequentially to the respective four photodiodes of the photodiode array 4 of the beam detector 4 so that the BD signals 61a to 61d are sequentially outputted from the beam detector 4 and supplied to the BD signal selecting apparatus 12 of the printer control apparatus. Those phototransistors applied with light from the respective four LEDs of the LED array 2 are turned on, while those phototransistors not applied with light from the LEDs due to shielding by the transfer sheet 62 remain turned off. As a result, the paper position of the transfer sheet under conveyance can be detected from an on-off status of the phototransistor array 3. The paper position information S2 obtained is sent from the paper position detector 1 to the BD selecting signal generating apparatus 13. In accordance with the paper position information S2, the BD selecting signal generating apparatus 13 sends a signal indicating which one of the BD signals 61a to 61d is to be selected, i.e., a BD selecting signal S1, to the BD signal selecting apparatus 12. In this case, the BD selecting signal S1 is outputted just before a latent image for the transfer sheet with its position detected is formed on the photosensitive drum 58, and it is held unchanged until the timing when another BD selecting signal S1 for a next transfer sheet is outputted. It is here noted that the paper position detector 1 is mounted at the position that the paper position can be detected before the time when the BD selecting signal S1 is outputted.

The BD signal selecting apparatus 12 selects a proper signal among the four BD signals 61a to 61d based on the BD selecting signal S1 to send it as a BD signal 61 to the VDO signal generating apparatus 14. The VDO signal generating apparatus 14 sends a VDO signal 51 to the laser unit 52 in synchro with the inputted BD signal 61. The content of the VDO signal 51 corresponds to the image information S3 outputted from the external host computer 15.

Figure 3:
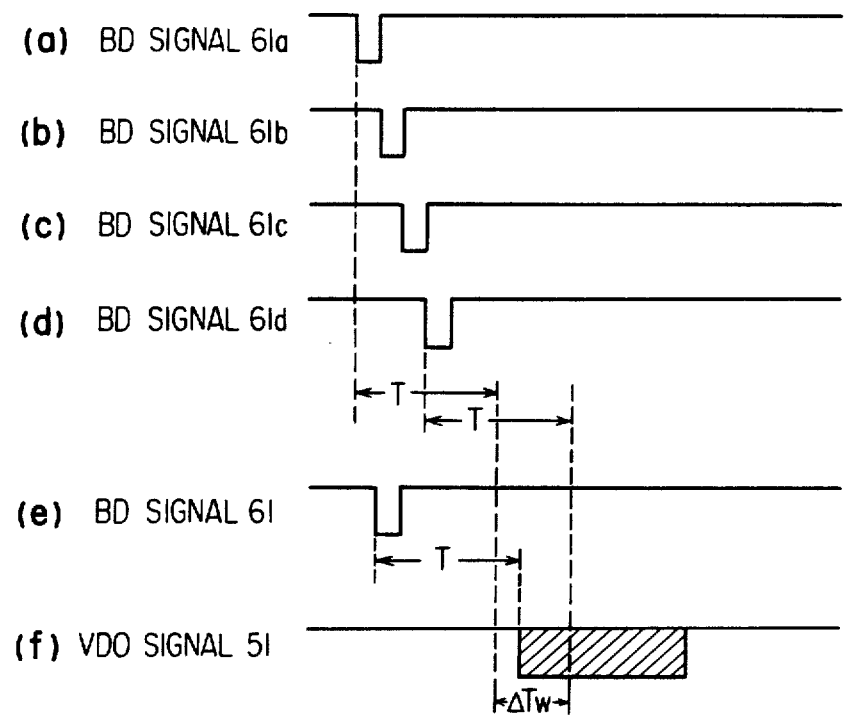
FIGS. 3(a) to 3(f) show a timing chart illustrating the operation of blocks of FIG. 2.

FIGS. 3(a) to 3(f) show a timing chart for explaining the operation of blocks of FIG. 2. FIGS. 3(a) to 3(d) shows the BD signals 61a to 61d sequentially outputted from the beam detector 4. FIG. 3(e) shows a BD signal 61 which is the BD signal 61b selected in accordance with the selecting signal S1. FIG. 3(f) shows a VDO signal 51 which is the image information S3 sent from the external host computer 15 and outputted by the VDO signal generating apparatus 14 in synchro with the BD signal 61 shown in FIG. 3(d).

As seen from FIGS. 3(a) to 3(f), the VDO signal 51 can take four output timings between ΔTw in accordance with a selected one of the BD signals 61a to 61d. That is, the image region on the photosensitive drum 58 can be adjusted in the main scanning direction at either one of the four positions. Therefore, by selecting a proper output timing of the VDO signal in accordance with the paper position on the paper feeding path, it is possible to prevent the displacement in printing in the main scanning direction. Further, if the number of photodiodes of the beam detector 4 in the above construction is increased, the adjustment range of the image region can be broadened or the fine adjustment can be made.

Figure 4:
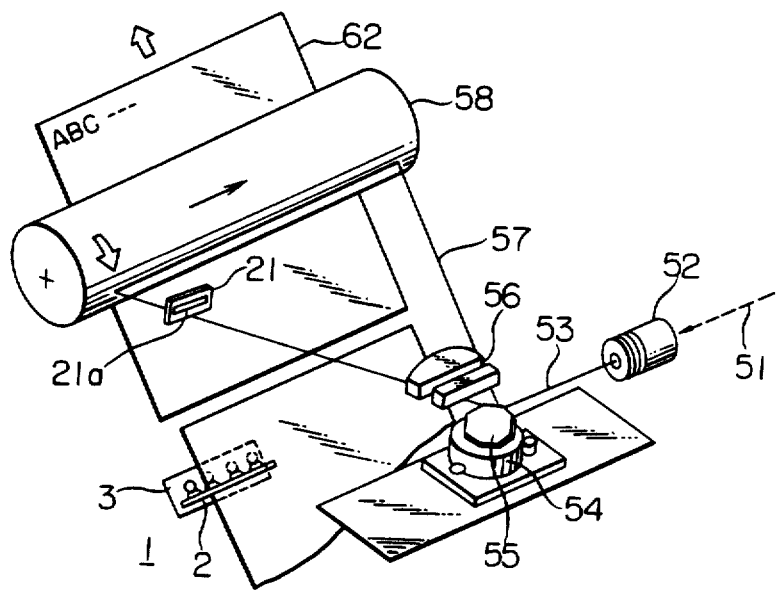
FIGS. 4 and 5 are perspective views showing other examples of the laser beam printer according to the present invention.
Figure 5:
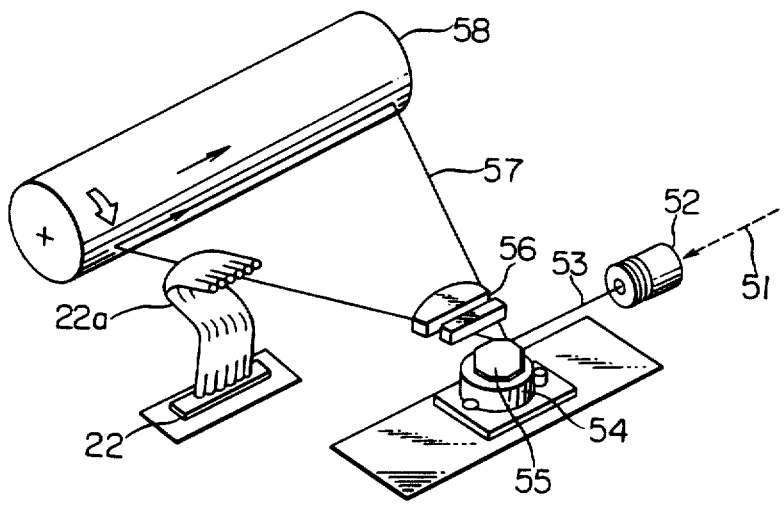

FIGS. 4 and 5 are perspective views showing the outline of the laser beam printers according to other embodiments of the present invention. In the embodiment of FIG. 4, a beam detector 21 is constructed of a photoelectric conversion element 21a such as a CCD and generates BD signals 61 when light is applied to the corresponding positions thereof. In the embodiment of FIG. 5, a beam detector 22 is constructed of an optical fiber array 22a, and is preferable for use with a laser beam printer having a small space for mounting the beam detector 22.

Figure 11:
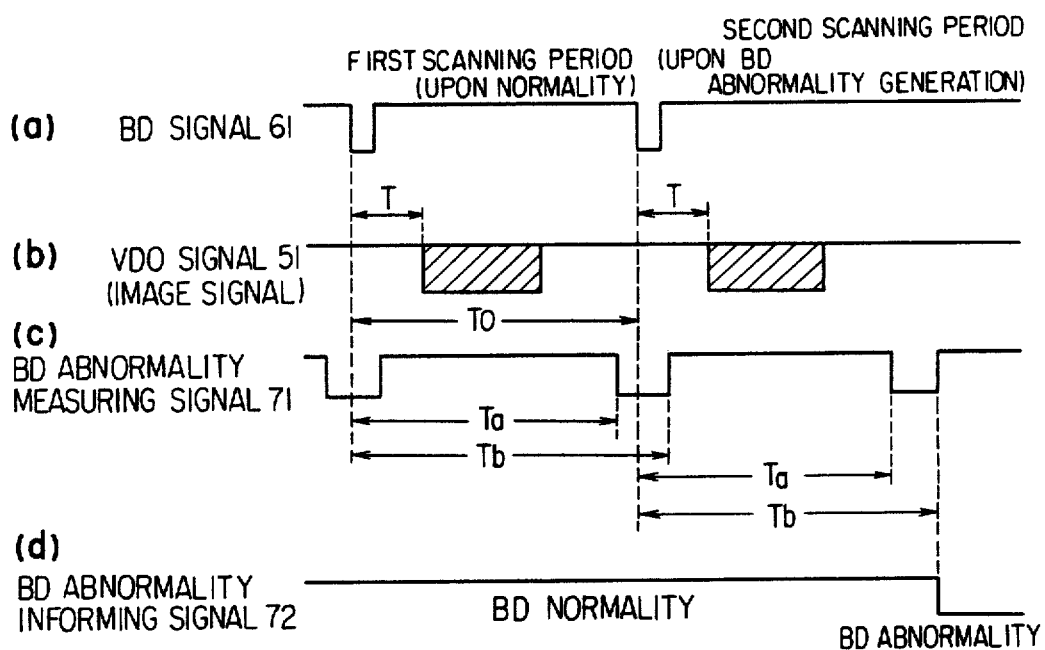
FIG. 11(a) to 11(d) show a timing chart illustrating the relationship between the VDO signal and the BD signal.
Figure 12:
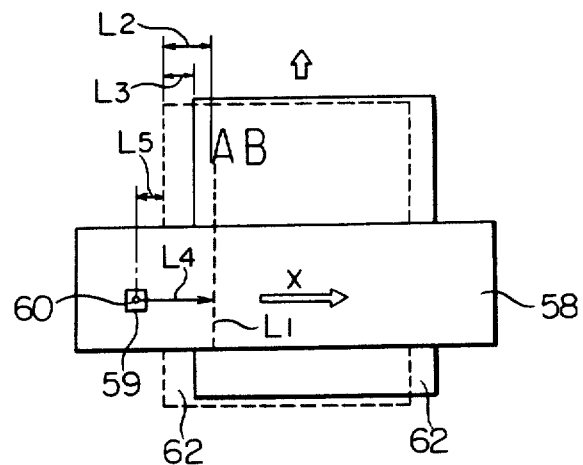
FIG. 12 is a plan view illustrating the relationship between the photosensitive drum and the transfer sheet shown in FIG. 10.

In the laser beam printer, wherein a printing position for a transfer sheet is corrected by changing the output timing of the BD signal 61 in accordance with the detected position displacement of the conveyed transfer sheet in the main scanning direction, there arises however a problem that the BD abnormality informing signal 12 shown in FIG. 11(d) may erroneously be detected during correction of printing position. Specifically, by changing the output timing of the BD signal 61, the scanning period To shown in FIGS. 11(a) to 11(d) is changed by a certain period $\Delta T$ and may become shorter than Ta or longer than Tb. Thus, an inability of detecting abnormality of the BD signal occurs in the laser beam printer while correcting the printing position by changing the output timing of the BD signal 61.

Other embodiments of the present invention will be described with reference to FIGS. 6 to 9.

Figure 6:
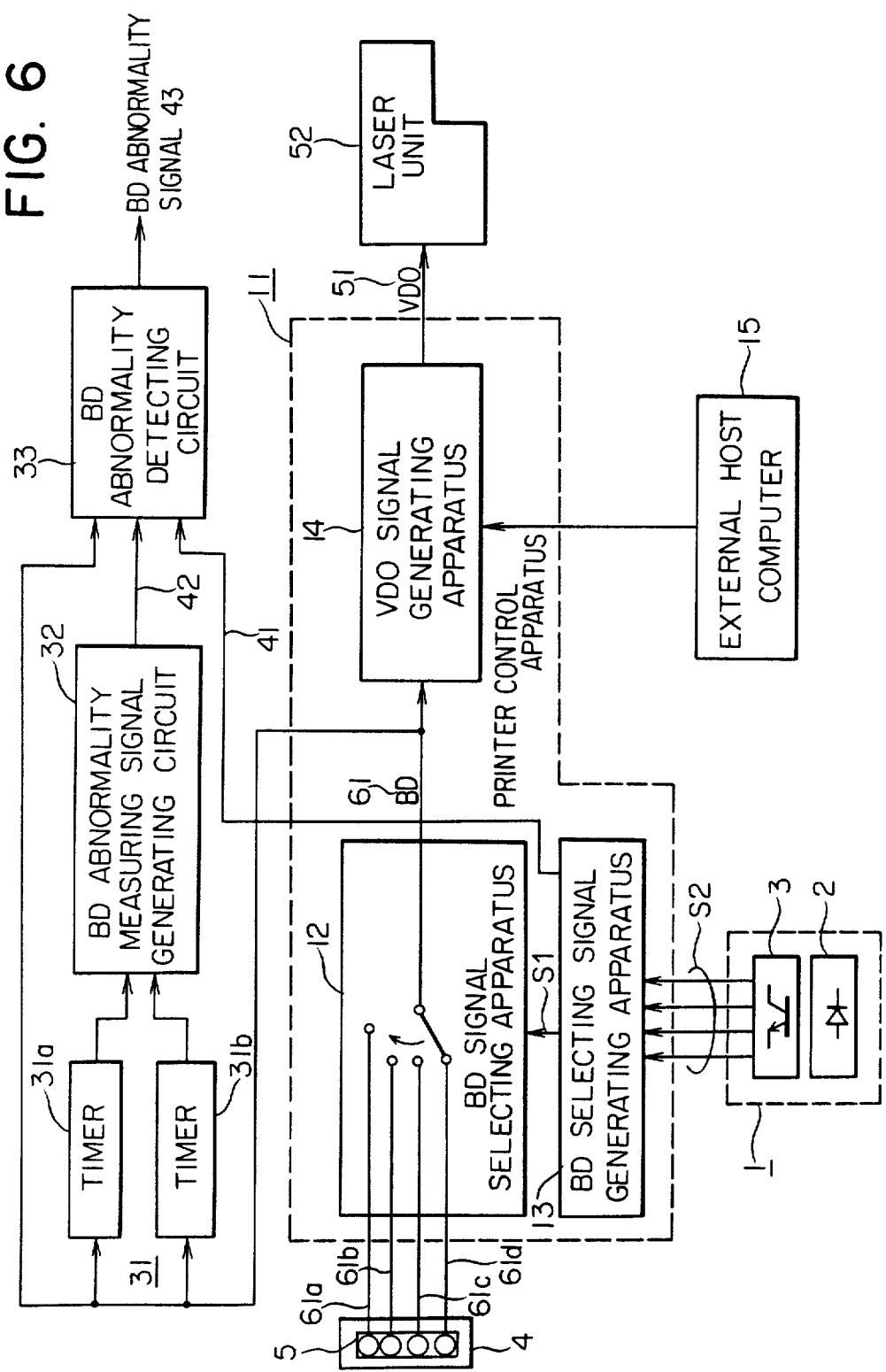
FIG. 6 is a block diagram illustrating the controlling operation of the laser beam printer according to another embodiment of the present invention.

FIG. 6 is a block diagram for explaining the controlling operation of the laser beam printer according to the embodiment, wherein elements identical to those in FIG. 2 are represented by using same reference characters and numerals.

In the figure, a managing section 31 is constructed of timers 31a and 31b, the timer 31a and 31b counting times Ta and Tb to be described later, respectively. The timers 31a and 31b are triggered by the BD signal 61 (selected one from the BD signals 61a to 61d) sent from the BD signal selecting apparatus 12. A BD abnormality measuring signal generating circuit 32 outputs a BD abnormality measuring signal 42 to be described later in response to the outputs from the timers 31a and 31b and supplies it to a BD abnormality detecting circuit 33. The BD abnormality detecting circuit 33 is also inputted with the BD signal 61 from the BD signal selecting apparatus 12 and outputs a BD abnormality signal 43 to be described later when the BD signal is detected at the timer excepting a BD output permitting time to be described later which is determined by the output timing of the selected BD signal 61.

FIGS. 7(a) to 7(d) show a timing chart illustrating the operation of blocks of FIG. 6. A BD timing switching trigger signal 41 of FIG. 7(a) is transmitted from BD selecting signal generating apparatus 13 to BD abnormarity detecting circuit 33 when one of the BD signals 61a to 61d is selected by the BD signal selecting apparatus 12. The BD abnormality measuring signal 42 of FIG. 7(c) is outputted from the BD abnormality measuring signal generating circuit 32. The BD abnormality signal 43 of FIG. 7(d) is outputted when the BD signal 61 is not detected during the time from when the BD timing switching trigger signal 41 is received and to when the BD abnormality measuring signal 42 is outputted. The BD abnormality measuring signal 42 is formed based on the time Ta measured by the timer 31 and the time Tb measured by the timer 31b. The time Ta is shorter than the ordinary period To of the BD signal 61 and shorter than the period (To$-\Delta T$) at the BD switching time when the output timing of the BD signal is quickened to a maximum to correct the paper feeding position displacement. The time Tb is longer than the ordinary period To of the BD signal 61 and longer than the period (To$+\Delta T$) at the BD switching time when the output timing of the BD signal is delayed to a maximum to correct the paper feeding position displacement.

As shown in FIGS. 7(a) to 7(d), at the timings when the BD signal 61 is outputted for correcting the printing position, the BD abnormality measuring signal 43 is arranged to hold a low level at the timings of its leading and trailing edges. As a result, the BD abnormality signal 43 does not become of a high level when the BD signal is switched. Further, in case where the BD signal 61 is detected at the time excepting the BD output permitting time and where the BD signal 61 is not outputted during the BD output permitting time, the BD abnormality signal 43 is outputted to inform a BD error.

Figure 8:
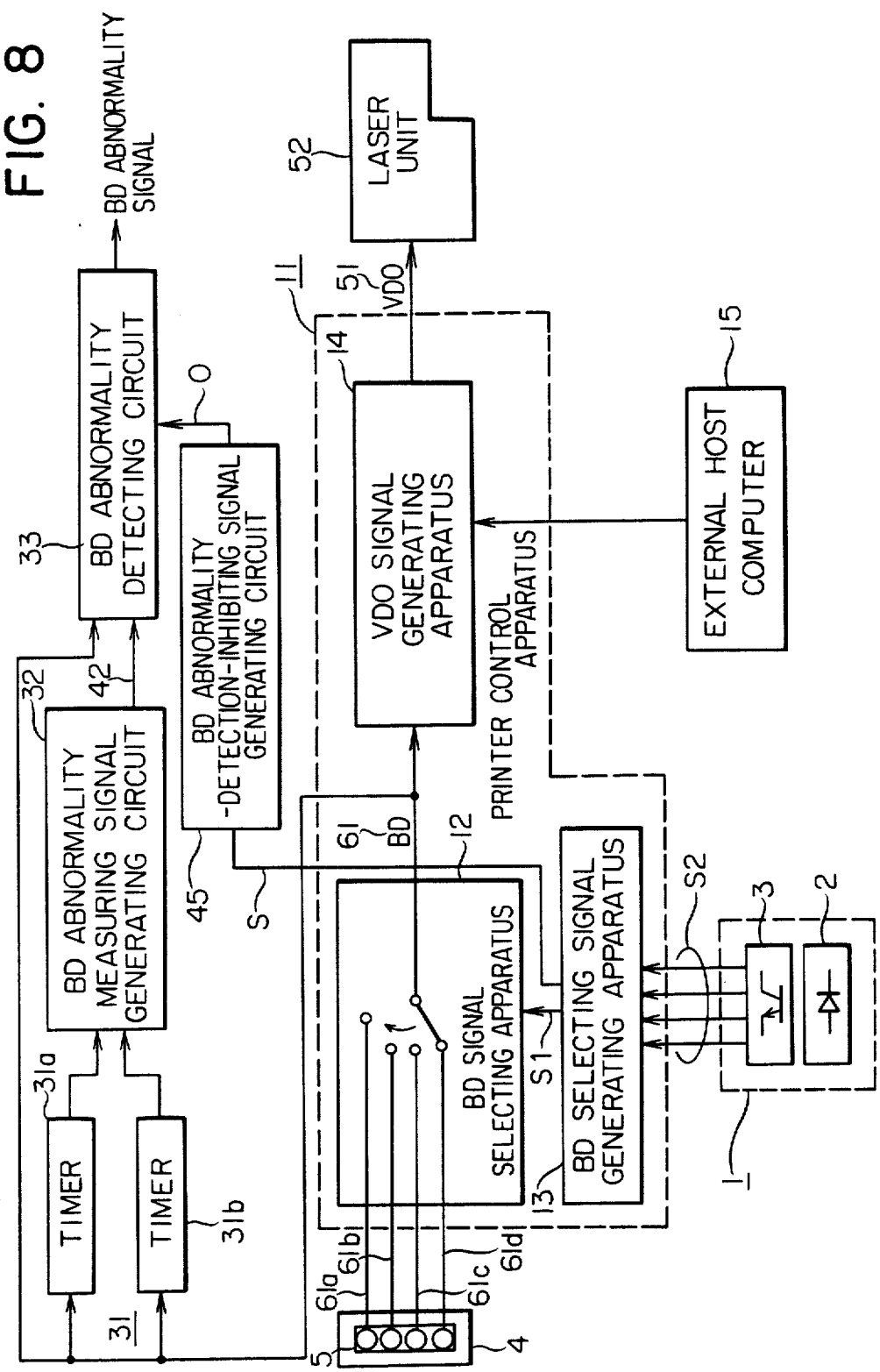
FIG. 8 is a block diagram illustrating the controlling operation of the laser beam printer according to a further embodiment of the present invention.

FIG. 8 is a block diagram for explaining the controlling operation of the laser beam printer according to a further embodiment of the present invention, wherein elements identical to those in FIG. 6 are represented by using same reference characters and numerals.

In FIG. 8, a BD abnormality-detection-inhibiting signal generating circuit 45 sends a BD abnormality-detection-inhibiting signal O (a pulse signal holding a low level during a certain time Ty) to a BD abnormality detecting circuit 33 in response to a BD timing switching trigger signal S sent from the BD selecting signal generating apparatus 13, to thereby inhibit informing a BD abnormality at the time when the BD signal 61 is switched. Ta and Tb may be set such that the BD abnormality measuring signal 42 holds a high level at the timing when the BD signal 61 is outputted.

FIGS. 9(a) to 9(f) show a timing chart for explaining the operation of blocks of FIG. 8, wherein those identical to FIGS. 7(a) to 7(d) are represented by using same reference characters and numerals.

FIG. 9(a) shows the BD timing switching trigger signal S sent from the BD selecting signal generating apparatus 13, FIG. 9(b) shows a BD abnormality detecting preliminary signal L indicative of whether the BD signal 61 has been outputted at the predetermined period, FIG. 9(e) shows the BD abnormality-detection-inhibiting signal O which is being sent for the certain time Ty in synchro with the BD timing switching trigger signal S to the BD abnormality detecting circuit 33 to thereby inhibit detecting a BD abnormality when the BD signal 61 is switched.

As seen from FIGS. 9(a) to 9(f), not only detection of the abnormality of the BD signal 61 with more severe timing can be accomplished in an ordinary case, but also detection of a BD abnormality is inhibited when the scanning period of the BD signal is changed for correcting the printing position so that an erroneous BD error detection can be avoided.

Next, the operation of the laser beam printer wherein the paper position displacement is large will be described.

Figure 13:
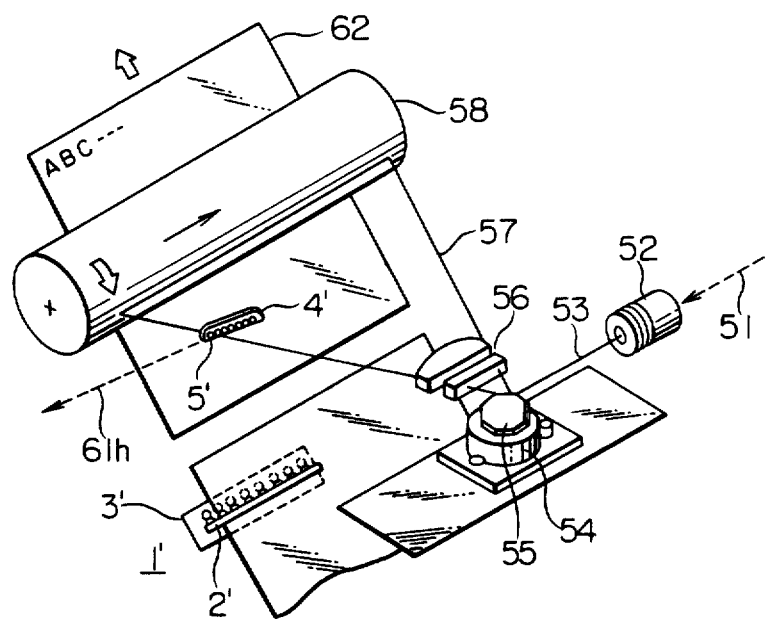
FIG. 13 is a perspective view showing the outline of the laser beam printer according to a still further embodiment of the present invention.

FIG. 13 is a perspective view of the outline of the of the laser beam printer according to an embodiment of the present invention, wherein elements identical to those in FIG. 1 are represented by using same reference numerals.

In the figure, a paper position detector 1' constituting position displacement detecting means of the present invention is constructed of an LED array 2' of 8 LEDs disposed on the left side end portion of a transfer sheet 62 on a paper feeding path and a phototransistor array 3' of 8 phototransistors disposed under paper position detector 1' symmetrically relative to the transfer sheet 62. A beam detector 4' constituting beam position detecting means of the present invention is constructed of a photodiode array 5' of 8 photodiodes and detects a laser beam 57 to output BD signals 61a to 61h to be described later. One of the BD signals 61a to 61h is selected by a BD signal selecting apparatus 12 (selecting means) to be described later.

Figure 14:
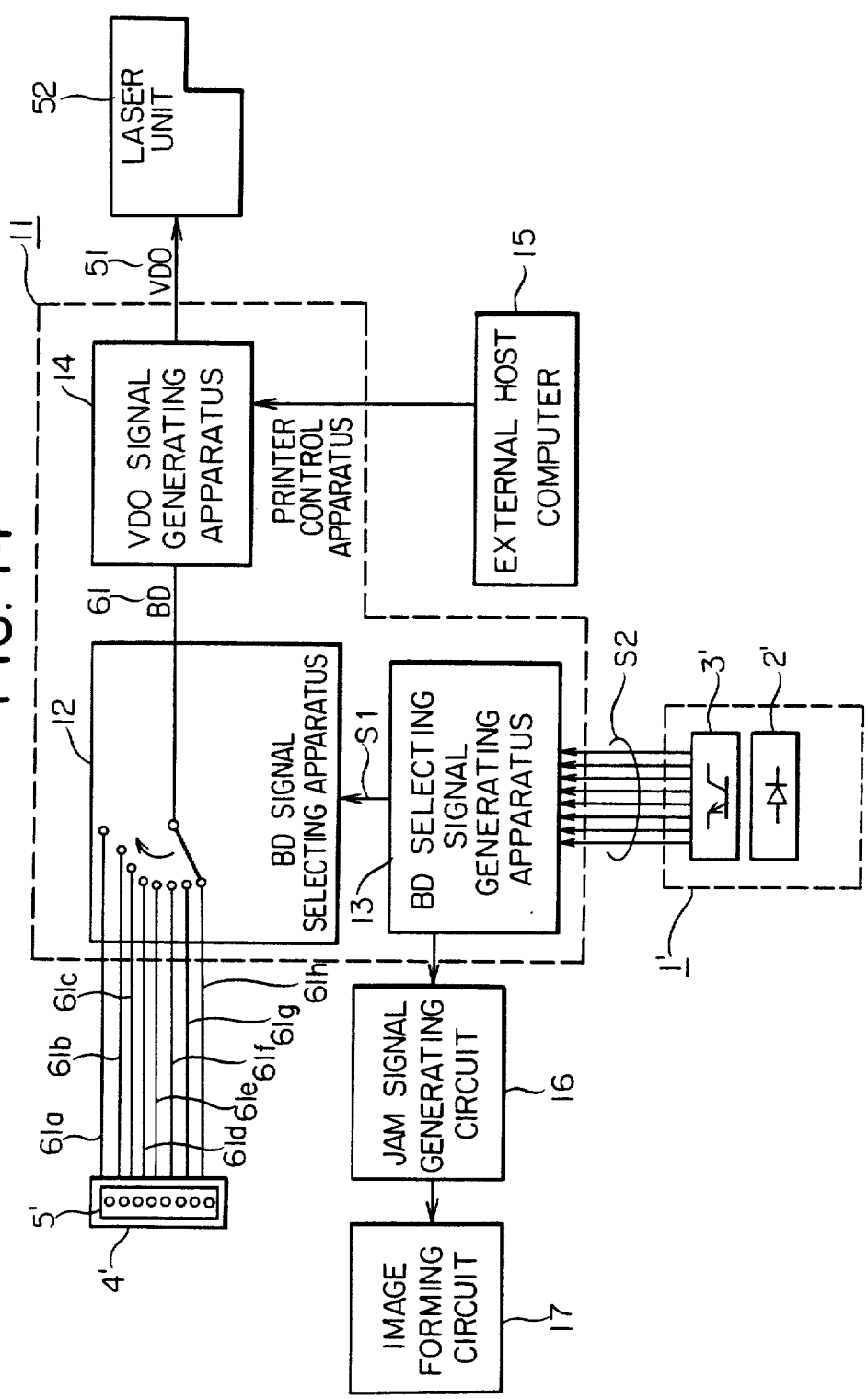
FIG. 14 is a block diagram for explaining the controlling operation of the laser beam printer of FIG. 13.

FIG. 14 is a block diagram for explaining the controlling operation of the laser beam printer shown in FIG. 13, wherein elements identical to those in FIGS. 10 and 13 are represented by same reference characters and numerals.

In the figure, a jam signal generating circuit 16 outputs a jam signal for stopping driving an image forming cirucit 17 in response to the command from a BD signal selecting apparatus 12 when the paper position displacement detected by the paper position detector 1 exceeds a predetermined range. The image forming circuit 17 includes a main motor for driving the photosensitive drum, a paper feeding system, a fixer, a developer and so on.

Next, a jam signal output operation of the jam signal generating circuit 16 will be described with reference to FIG. 14.

In the paper position detector 1', those phototransistors are turned off to which light from LEDs of the LED array 2' is intercepted by the transfer sheet 62 under conveyance, while those transistors are turned on to which light is applied. If the LED array 2' of 8 LEDs is displaced in the main scanning direction X to the right or left side of the transfer sheet 62 under conveyance, all of 8 phototransistors of the phototransistor array 3' are turned on or off. At this time, the BD signal selecting apparatus 12 judges such a case to be a jam and outputs a command to the jam signal generating circuit 16. Then, the jam signal generating circuit 16 outputs a jam signal to the image forming circuit 17 to stop forming an image, and prevents loosing inputted image information.

In the foregoing embodiments, a plurality of BD signals are generated and one of them is selected. However, the output timing of the BD signal may be changed by moving the beam detector itself. The description will now be directed to such method.

Figure 15:
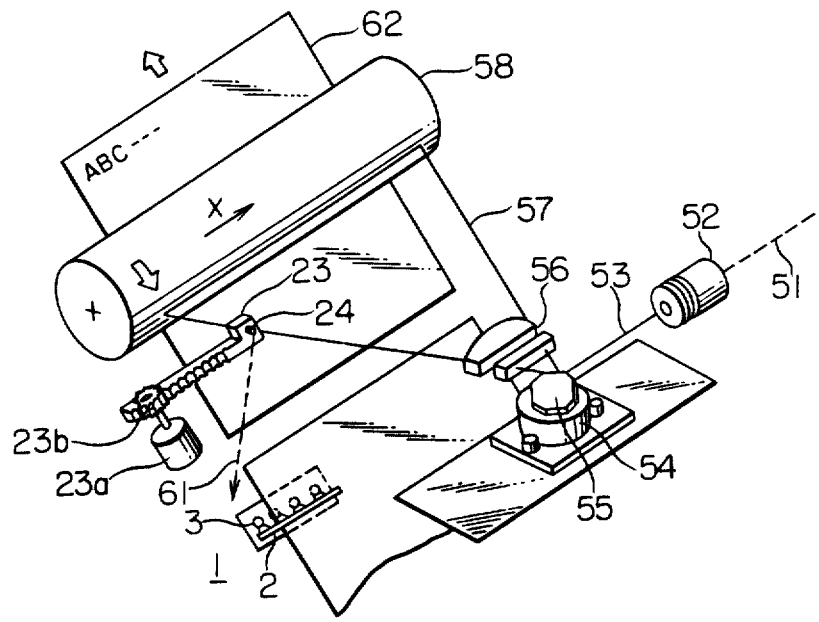
FIG. 15 is a perspective view showing the outline of the laser beam printer according to another embodiment of the present invention.

FIG. 15 is a perspective view showing the outline of the laser beam according to an embodiment of the present invention, wherein elements identical to those in FIG. 1 are represented by using same reference numerals.

In the figure, a paper position detector 1 constituting position displacement means of the present invention is constructed of an LED array 2 of 4 LEDs disposed at a predetermined position near the left side portion of the transfer sheet 62 under conveyance and phototransistor array 3 of 4 phototransistors disposed symmetrically relative to the transfer sheet 62. A beam detector 23 constituting beam position detecting means of the present invention is arranged to be movable in the main scanning direction X by rotation of a pulley 23b mounted at a stepping motor 23a. The beam detector 23 outputs a BD signal 61 when it detects a laser beam 57. That is, a photodiode 24 of the beam detector receives the laser beam 57 and sends the BD signal to a printer control apparatus 11 to be described later.

FIG. 16 is a block diagram for explaining the controlling operation of the laser printer shown in FIG. 15, wherein elements identical to those in FIGS. 1 and 2 are represented by using same reference characters and numerals.

In the figure, a beam detector position control apparatus 25 generates a pulse signal for driving the stepping motor 23a in response to paper position information S from the paper position detector 1.

The paper position information thus obtained is transferred from the paper position detector 1 to the beam detector position control apparatus 25. This beam detector position control apparatus 25 compares based on the paper position information S2 the position of the transfer sheet 62 with that previously conveyed and calculate the displacement in the main scan direction of the transfer sheet 62 from the previous one. In accordance with the calculated displacement, the beam detector position control apparatus 25 sends a pulse signal to the stepping motor 23a to move the beam detector 23.

The timing when the beam detector position control apparatus 25 drives the stepping motor 23a to move the beam detector 23 is just before the latent image is formed on the photosensitive drum 58 for the transfer sheet associated with the paper position information now concerned.

To this end, the paper position detector 1 is disposed at such a position that the paper position can be detected before the pulse signal for moving the beam detector 23 is outputted.

Figure 17:
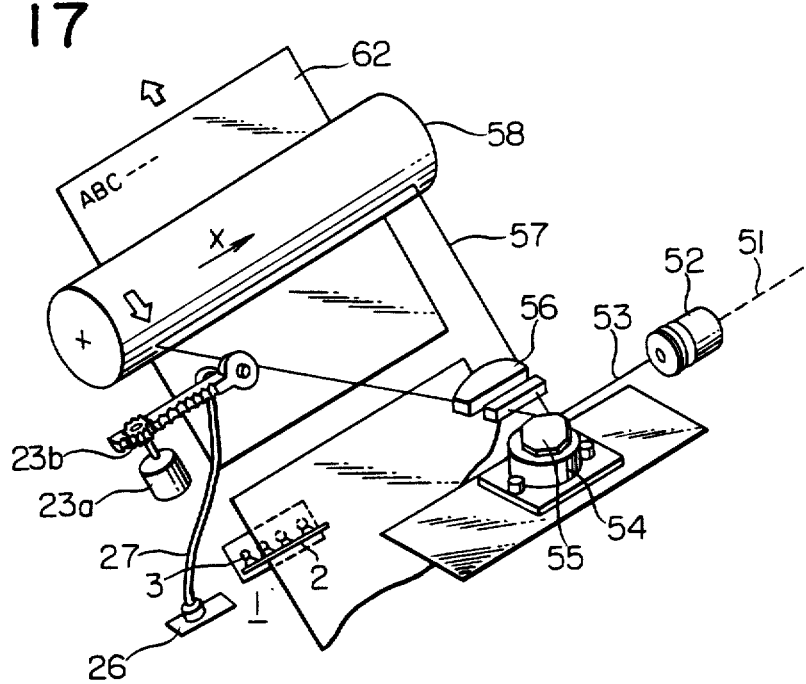
FIG. 17 is a perspective view showing the outline of the laser beam printer according to a further embodiment of the present invention.

FIG. 17 is a perspective view showing the outline of the laser beam printer according to an embodiment of the present invention, wherein an optical fiber cable 27 guides an incident laser beam 57 to a beam detector 26 disposed at a desired position.

As seen from FIG. 17, the stepping motor 23a moves the optical fiber cable 27 in the main scanning direction in accordance with paper position information S from the paper position detector 1 to thereby setting the beam detector 26 at a desired position.

The correction value in printing displacement is obtained based on the relative position between the current transfer sheet and the previous one, and the corrected value is retained at least for the time one page transfer sheet 62 completely passes over.

Apart from the foregoing embodiments, a delay circuit may be used for changing the output timing of the BD signal.

FIG. 18 is a block diagram showing the laser beam printer according to an embodiment of the present invention, wherein elements identical to those in FIG. 2 are represented by using same reference characters and numerals.

In the figure, a laser beam detector 28 constructed of a photodiode 29 detects a laser beam 57 to output a signal to a delay circuit 71. The delay circuit 71 changes its delay time in accordance with paper position information S from a paper position detector 1 to thereby change the output timing of a BD signal 61.

As seen from the above embodiments, it can be understood that it is not necessary to change the output timing of image signals at the host computer side so as to correct the paper position displacement.

The present invention is not limited to the above-described embodiments, but various alterations are possible within the scope of the appended claims.

We claim:

1. A laser beam printer comprising:
a recording medium for forming an image;
scanning means for scanning a beam modulated by an image signal on said recording medium; and
means for detecting the position of said beam scanned by said scanning means;
wherein said detecting means outputs a plurality of synchro signals for defining the record start position on said recording medium.

2. A laser beam printer according to claim 1, wherein said detecting means includes a plurality of beam detecting elements.

3. A laser beam printer according to claim 1, further comprising means for selecting said plurality of synchro signals outputted from said detecting means.

4. A laser beam printer comprising:
a recording medium for forming an image;
scanning means for scanning a beam modulated by an image signal on said recording medium;
means for detecting the position of said beam scanned by said scanning means, said detecting means outputting a synchro signal which defines the record start position on said recording medium;
sheet position detecting means for detecting the position of a sheet to which the image formed on said recording medium is transferred, said sheet position detecting means detecting the position of a sheet in the direction of scanning said beam; and
means for controlling the output timing of said synchro signal in accordance with the position of a sheet detected by said sheet position detecting means.

5. A laser beam printer according to claim 4, wherein said beam position detecting means outputs a plurality of synchro signals, and said controlling means selects one of said plurality of synchro signals.

6. A laser beam printer according to claim 4, further comprising means for moving said beam position detecting means, wherein said controlling means controls the amount of movement of said beam position detecting means.

7. A laser beam printer according to claim 4, wherein said beam position detecting means includes means for delaying said synchro signal, and said controlling means controls the delay time of said delaying means.

8. A laser beam printer comprising:
a recording medium for forming an image; scanning means for scanning a beam modulated by an image signal on said recording medium;
means for detecting the position of said beam scanned by said scanning means, said detecting means outputting a synchro signal which defines the record start position on said recording medium;
sheet position detecting means for detecting the position of a sheet to which the image formed on said recording medium is transferred, said sheet position detecting means detecting the position of a sheet in the direction of scanning said beam; and
means for stopping the image forming operation when said sheet position detecting means detects that the sheet position is outside of a predetermined range.

9. A laser beam printer according to claim 8, wherein said sheet position detecting means includes a plurality of detecting elements.

10. A laser beam printer comprising:
a recording medium for forming an image;
scanning means for scanning a beam modulated by an image signal on said recording medium;
means for detecting the position of said beam scanned by said scanning means, said detecting means outputting a synchro signal which defines the record start position on said recording medium;
first control means for controlling the output timing of said synchro signal;
means for detecting an abnormality of said synchro signal; and
second control means for switching an abnormality detecting mode of said abnormality detecting means when an output status of said synchro signal is changed by said first control means.

11. A laser beam printer according to claim 10, wherein said second control means inhibits the operation of said abnormality detecting means.

12. A laser beam printer according to claim 10, wherein said abnormality detecting means includes means for outputting a signal for detecting an abnormality of said synchro signal, and said second control means controls outputting said abnormality detecting signal.

13. A laser beam printer according to claim 10, wherein said abnormality detecting means checks the period of said synchro signal outputted.

14. A laser beam printer according to claim 10, wherein said first control means controls the output timing of said synchro signal in accordance with the position of a sheet to which the image formed on said recording medium is transferred.

* * * * *

UNITED STATES PATENT AND TRADEMARK OFFICE
CERTIFICATE OF CORRECTION

PATENT NO. : 4,712,118

DATED : December 8, 1987

INVENTOR(S) : K. SETO, ET AL.

It is certified that error appears in the above-identified patent and that said Letters Patent is hereby corrected as shown below:

IN THE DRAWINGS

Figure 7:
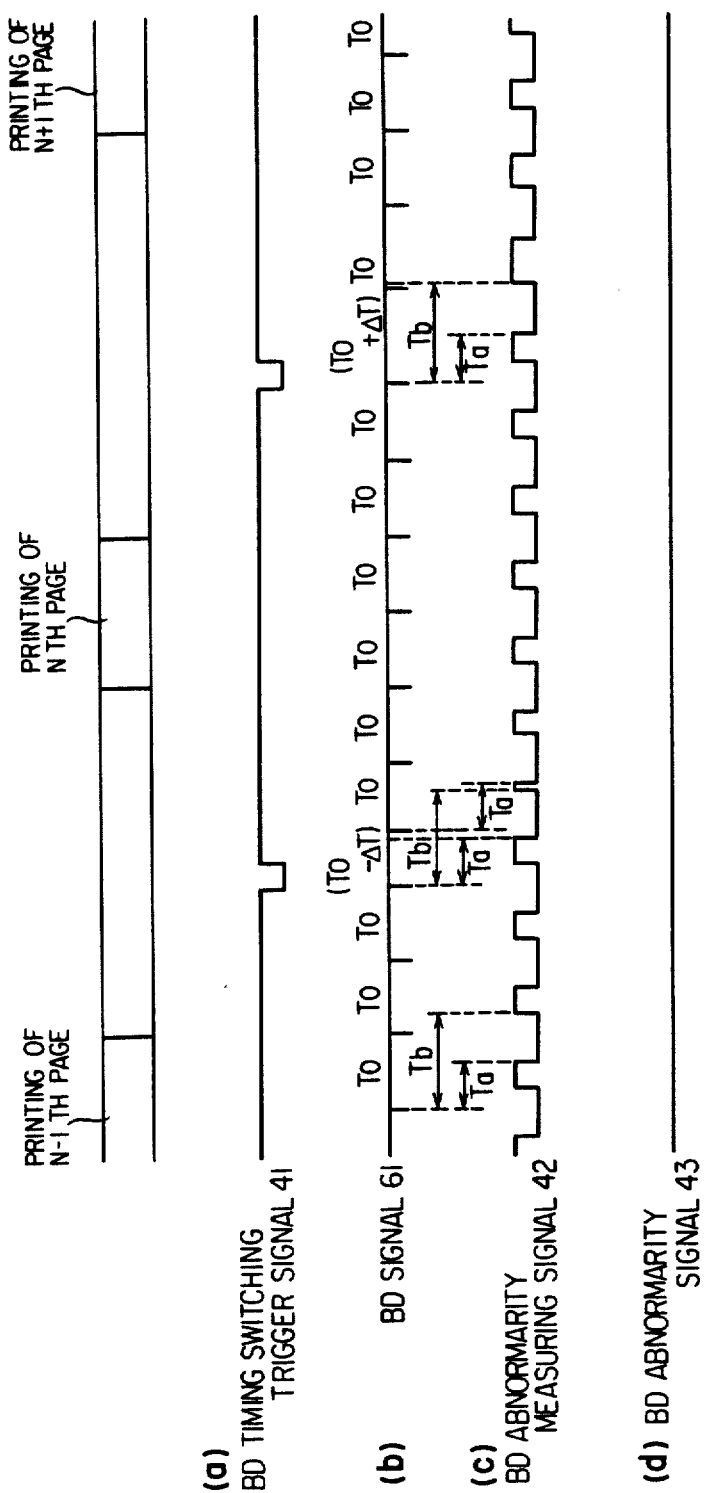
FIGS. 7(a) to 7(d) show a timing chart illustrating the operation of blocks of FIG. 6.
Figure 9:
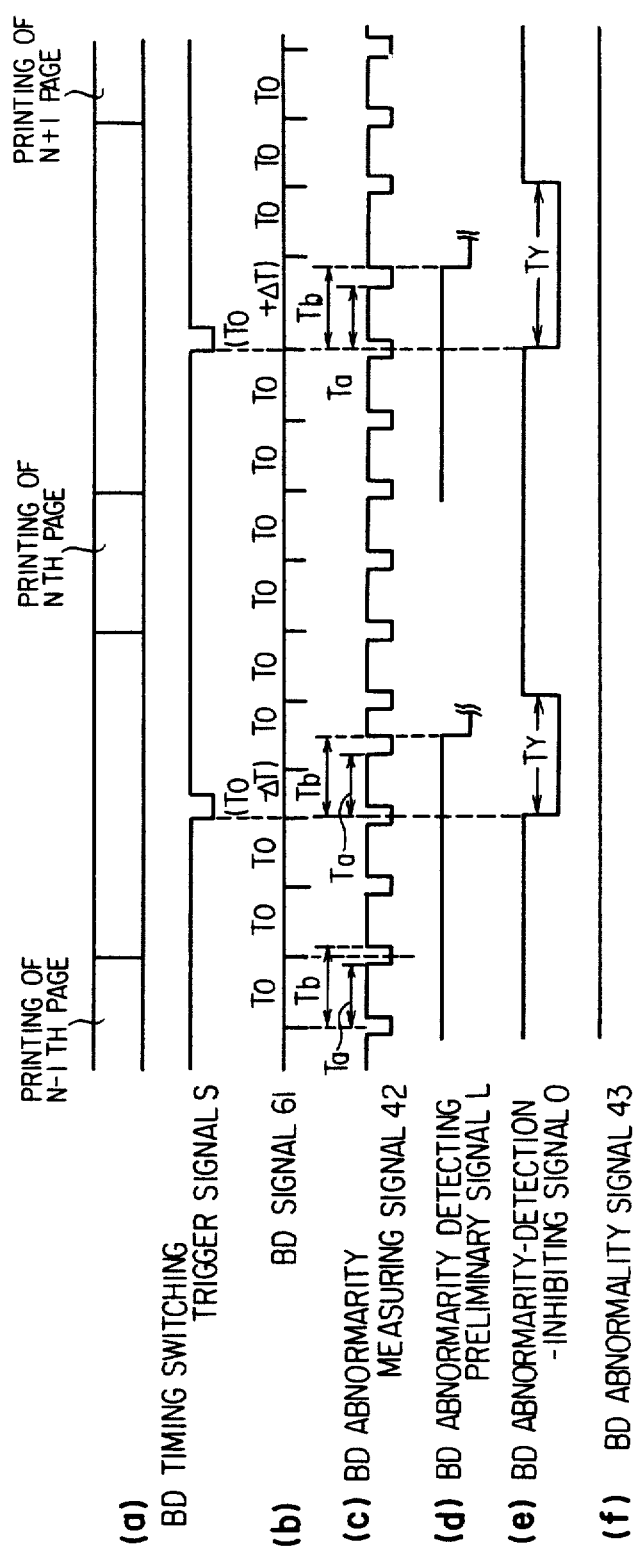
FIGS. 9(a) to 9(f) show a timing chart illustrating the operation of blocks of FIG. 8'.

Fig. 7, "BD ABNORMARITY" should read
        --BD ABNORMALITY-- (both occurrences).
    Fig. 9, "BD ABNORMARITY" should read
        --BD ABNORMALITY-- (three occurrences).

COLUMN 1

Line 27, "toner)." should read --(toner).--.
    Line 53, "synchronously" should read
        --in synchronism--.

COLUMN 2

Line 64, "written a" should read --written with a--.

COLUMN 3

Line 21, "FIG. 8'" should read --FIG. 8;--.
    Line 24, "FIG. 11(a) to 11(d)" should read
        --FIGS. 11(a) to 11(d)--.
    Line 49, "emodiments" should read --embodiments--.
    Line 55, "using same" should read --using the same--.
    Line 61, "trahsfer" should read --transfer--.

UNITED STATES PATENT AND TRADEMARK OFFICE
CERTIFICATE OF CORRECTION

PATENT NO. : 4,712,118

DATED : December 8, 1987

INVENTOR(S) : K. SETO, ET AL.

It is certified that error appears in the above-identified patent and that said Letters Patent is hereby corrected as shown below:

COLUMN 4

Line 1, "using same" should read --using the same--.
    Line 21, "array 4" should read --array 5--.
    Line 59, "shows" should read --show--.

COLUMN 5

Line 30, "signal 12" should read --signal 72--.
    Line 45, "using same" should read --using the same--.
    Line 51, "one from" should read --from one of--.
    Line 68, "marity" should read --mality--.

COLUMN 6

Line 37, "using same" should read --using the same--.
    Line 51, "using same" should read --using the same--.

COLUMN 7

Line 6, "of" (third occurrence) should be deleted.
    Line 7, "the" should be deleted.
    Line 9, "using same" should read --using the same--.
    Line 28, "by same" should read --by the same--.
    Line 32, "circuit 17" should read --circuit 17--.
    Line 55, "loosing" should read --losing--.
    Line 65, "using same" should read --using the same--.

UNITED STATES PATENT AND TRADEMARK OFFICE
CERTIFICATE OF CORRECTION

PATENT NO. : 4,712,118　　　　　　　　　　　　　　　　Page 3 of 3

DATED : December 8, 1987

INVENTOR(S) : K. SETO, ET AL.

It is certified that error appears in the above-identified patent and that said Letters Patent is hereby corrected as shown below:

COLUMN 8

Line 17, "using same" should read --using the same--.
　　Line 29, "calculate" should read --calculates--.
　　Line 54, "to" should be deleted.
　　Line 67, "using same" should read --using the same--.

COLUMN 10

Line 4, "image; scanning" should read:
　　　--image;
　　　　　¶scanning--.

Signed and Sealed this

Twenty-first Day of June, 1988

Attest:

DONALD J. QUIGG

Attesting Officer　　　　Commissioner of Patents and Trademarks